United States Patent [19]
Jamieson

[11] Patent Number: 5,596,515
[45] Date of Patent: Jan. 21, 1997

[54] MICROPROCESSOR CONTROL CIRCUIT WITH INVERTED RESET AND EXTENDABLE RUNTIME

[75] Inventor: J. Scott Jamieson, Waukesha, Wis.

[73] Assignee: Johnson Service Company, Milwaukee, Wis.

[21] Appl. No.: 315,375

[22] Filed: Sep. 30, 1994

[51] Int. Cl.$^6$ .................................................. G06F 17/00
[52] U.S. Cl. ............................ 364/570; 364/480; 431/26
[58] Field of Search .................................... 364/480, 569, 364/570, 184, 186, 503; 395/750, 800; 327/143, 172, 174, 184; 431/18, 26

[56] References Cited

U.S. PATENT DOCUMENTS

| | | | |
|---|---|---|---|
| 4,931,975 | 6/1990 | Gleason, III et al. | 364/570 |
| 5,051,936 | 9/1991 | Gleason, III et al. | 364/570 |
| 5,408,573 | 4/1995 | Jamieson et al. | 388/815 |

Primary Examiner—James P. Trammell
Assistant Examiner—M. Kemper
Attorney, Agent, or Firm—Harness, Dickey & Pierce, P.L.C.

[57] ABSTRACT

A microprocessor-based burner control apparatus for use in preventing incorrect ignition signals. An inverting circuit inverts and limits the magnitude of a periodic input supply voltage to create an activating signal. This activating signal is applied to the reset terminal of the microprocessor, which enters an active state during the logic high level of the activating signal and enters an inactive state during the logic low level of the activating signal. The processor is connected to the output circuits, which can only be operated during the positive half-cycle of the input supply voltage. During initial operation of the system, the microprocessor is only active during the negative half-cycle, at which time the outputs cannot be activated. The microprocessor then performs a series of tests on the system, and if all the tests are passed, the microprocessor generates an output signal. This output signal is applied to the reset terminal of the microprocessor, where it combines with the activating signal to form an override signal. The override signal allows the microprocessor to extend its active state into the positive half-cycle and operate the output circuits. The extended active state of the microprocessor also allows for better control of the output circuits due to the increase in processing time during each cycle of the input supply voltage.

9 Claims, 1 Drawing Sheet

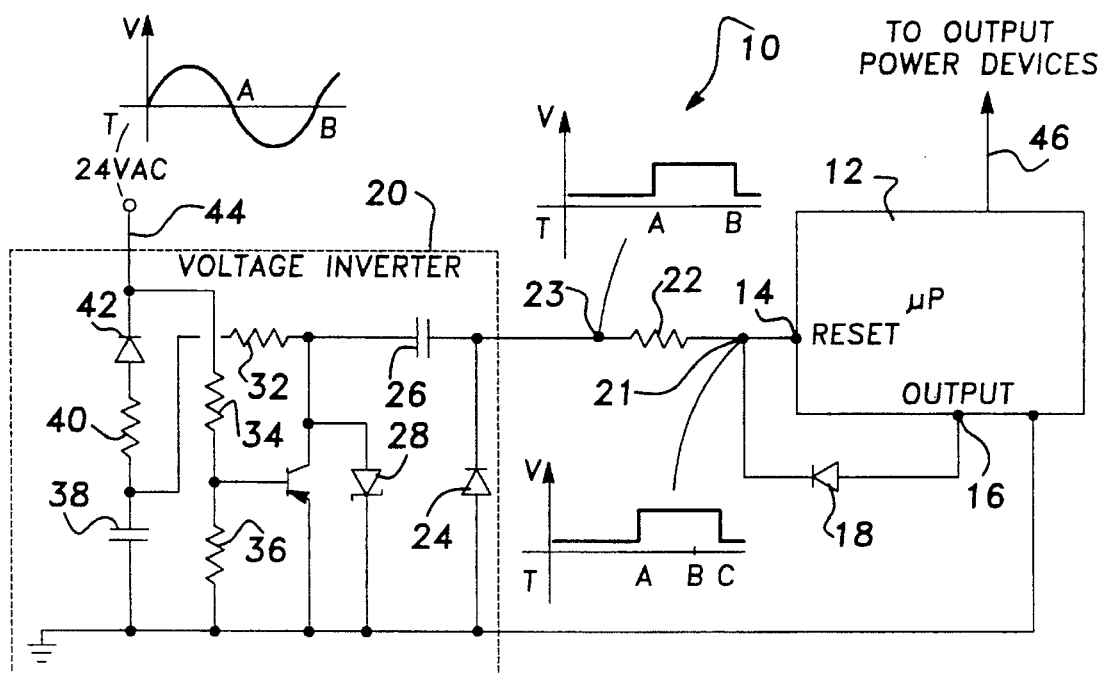
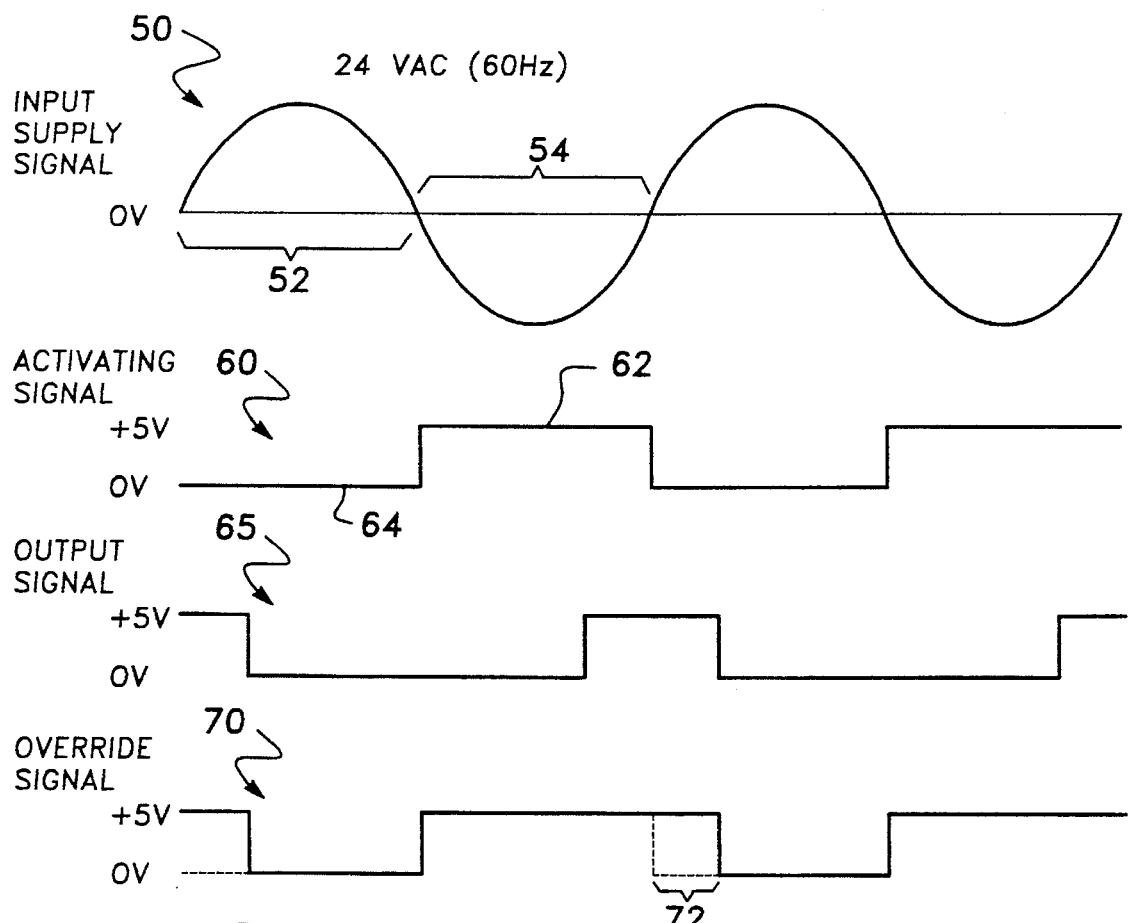

MICROPROCESSOR CONTROL CIRCUIT WITH INVERTED RESET AND EXTENDABLE RUNTIME

BACKGROUND OF THE INVENTION

This invention relates generally to a controller of the type suitable for activating a switch device of an electronic type, such as may be used in a combustible fuel burner. More specifically, the invention relates to a microprocessor-based controller apparatus for executing a linear program in synchrony with a recurring inverted signal coupled to the reset terminal of the microprocessor. The preferred embodiments of the invention employing the microprocessor-based controller will be described with reference to combustible fuel burner systems, however the invention is not so limited. The invention is in fact applicable in any application where a high reliability microprocessor-based control circuit is desired.

A variety of gas ignition controls are known and generally include an apparatus constructed of discrete components for effecting a single, predetermined control sequence tailored to a specific application. Such gas ignition systems typically include a relay which is energized in response to a thermostatic demand for heat and for actuating a pilot gas valve, spark generating circuit for igniting the pilot gas either coincidently with the energization of the pilot valve or within a predetermined time thereafter, a flame-sensing probe for detecting the presence of a pilot flame and an output relay section for energizing a main fuel valve upon a detection of the pilot flame. Refinements of this fundamental system may include a pair of electromagnetic relays which are required to be operated in a particular sequence upon each reception of a thermostatic demand for heat. The sequential operation of these relays is effective in verifying the integrity of certain circuit components. Examples of such gas ignition systems are shown and described in U.S. Pat. Nos. 4,077,762 and 4,178,149. While these gas ignition systems have heretofore been satisfactory, they fail to appreciate the manner in which a microprocessor may be utilized to continually monitor and verify the integrity of certain circuit components.

An example of a microprocessor-based controller is disclosed in U.S. Pat. Nos. 4,581,697 and 4,931,975, assigned to the assignee of the present invention. These microprocessor-based apparatus make use of the capabilities of the microprocessor to monitor various variables within the entire system to created a moderately high rate of reliability. However, in a combustion fuel burner and other applications requiring a very high degree of reliability, it is necessary to predict and/or limit the possible failure modes which may be cause by a malfunction in the timing or internal working of the microprocessor itself. Conventional microprocessor-based systems, driven by software, can theoretically have an infinite number of failure modes, some of which may be due to a failure within the physical structure of the microprocessor itself. These microprocessor controllers are typically operated on the positive portion of the input power supply, during which time the output circuits of the system are also able to be operated. Therefore, a failure in the microprocessor could result in the operation of the output circuits in the wrong sequence or at inopportune times. Accordingly, a microprocessor-based control system offering a high degree of reliability which takes into account possible failures within the microprocessor would be a distinct advance in the art.

SUMMARY OF THE INVENTION

The broad goal of the present invention is to provide an apparatus for increasing the control over the outputs of a gas burner ignition control system to prevent an incorrect ignition signal from activating the outputs.

These and other objects are achieved in the present invention by using a microprocessor which executes and operates a program for processing information from the gas burner ignition system. This processor has a reset terminal, which receives an activating signal from inverting circuitry of the system, and an output terminal which is connected to the reset terminal. The output terminal of the processor supplies an output signal which combines With the activating signal at the reset terminal to form an override signal. The override signal at the reset terminal has either a high or low level.

Also contained in the invention is inverting circuitry for supplying the activating signal to the reset terminal of the processor. This inverting circuit receives the periodic input supply signal, in the preferred embodiment an AC voltage, and inverts the signal to create the activating signal. This activating signal has succeeding and repetitive first and second signal levels which are 180° out of phase from the input supply signal. The activating signal is a square wave which is limited in magnitude to a logic high and a logic low.

The processor responds to the activating signal and enters an inactive state when the activating signal is at the low level. This low level of the activating signal corresponds to the positive half-cycle of the periodic input supply voltage. Accordingly, the processor enters an inactive state when the activating signal is at the logic low level. Therefore, the processor is initially operational only during the negative half-cycle of the input supply voltage.

The processor will remain in the active state and extend the processing time to the positive half cycle of the input supply voltage when the override signal is at a first, logic high level and the activating signal is at a second, logic low level. The processor will remain in the active state to extend the processing time only after the processor has successfully completed a series of tests. The output circuits of the gas burner ignition system are only able to be operated during the positive half-cycle of the input supply voltage. Therefore, the outputs are only operational during the period of time the processor remains active to extend the processing time into the positive half cycle. This period of time is when the override signal is at the first, high level and the activating signal is at the second, low level.

BRIEF DESCRIPTION OF THE DRAWINGS

FIG. 1 is a detailed electrical schematic of the microprocessor-based controller and inverting circuitry in accordance with the present invention;

FIG. 2 depicts wave form and timing diagrams useful in conjunction with FIG. 1 to gain an understanding of the operation of the present invention.

DETAILED DESCRIPTION OF A PREFERRED EMBODIMENT

FIG. 1 illustrates the control circuit of the present invention as part of a gas burner control system generally designated 10. A microprocessor 12 has its output terminal 16 externally connected to its RESET terminal 14 though a isolation diode 18. The isolation diode provides additional isolation of the microprocessor from the rest of the system.

The RESET terminal 14 is also connected to a voltage inverting circuit 20 through a source resistance 22. Source resistance 22 is used to limit the voltage from the voltage inverter 20, so that the output terminal 16 can selectively overpower the voltage inverter signal at specific times determined by the microprocessor, as will be more fully described below.

The voltage inverter 20 both inverts the input supply voltage 44 and limits its magnitude. The resulting signal at point 23 coming from the inverting circuit 20 is a square wave having a high voltage value preferably around +5 volts and a low voltage value preferably around −0.6 volts. The input supply voltage 44 in the preferred embodiment is 24 volts AC, although the circuit design will work with a variety of periodic input waveforms. The voltage inverter 20 contains a switching device, transistor 30, which has its base connected to the input supply voltage 44 through a voltage divider consisting of resistors 34 and 36. As the input supply voltage is periodic, transistor 30 will switch on and off depending on the half cycle of the supply voltage. The collector of transistor 30 is connected to a Zener diode 28 which clamps the output of the voltage inverter 20 to a selected high value, preferably around 5.1 volts. Also contained in the voltage inverter is circuitry which is a negative voltage source, consisting of diode 42, resistor 40, and capacitor 38. The junction of resistor 40 and capacitor 38 is connected through resistor 32 to the collector of transistor 30. The collector of transistor 30 is connected to capacitor 26, which is in turn connected to ground by diode 24 and to the source resistance 22, through which the inverted supply signal is applied to the reset terminal 14.

As is well known in the art, operation of the gas burner control system 10 is initiated when a pair of thermostat contacts (not shown) closes, indicating a need for heat in the area being controlled. Power is then supplied to the voltage inverter circuit 20 from an input supply source (not shown) at point 44. In the preferred embodiment, this input supply signal is a 24 volt AC signal 50, as shown in FIG. 2, which corresponds to the input supply voltage 44 in FIG. 1. This 24-volt AC signal is inverted and its magnitude is limited to selected high and low levels by the inverter circuit 20 to create an activating signal 60 as shown in FIG. 2. The activating signal 60 corresponds to the signal at point 23 of FIG. 1. The high level 62 of the activating signal 60 corresponds to the negative half cycle 54 of the input supply signal 50 and has a desired value of around 5 volts, while the low level 64 of the activating signal 60 corresponds to the positive half cycle 52 of the input supply signal 50 and is typically around −0.6 volts. The activating signal 60 is then supplied through source resistance 22 to the RESET terminal 14 of the microprocessor. As the voltage on the RESET terminal exceeds a pre-determined level, the processor enters an active state and executes a complete linear software program.

Microprocessor 12 is operated on a synchronous reset basis, utilizing a linear program concept. This concept resets the microprocessor repetitively and synchronously with a reference signal, preferably such as a 60 Hz line frequency. The operating software contained in the microprocessor first checks itself for data integrity and then performs the next necessary functional steps in the linear sequence of the program. By using a linear sequence of program steps, the system can be designed with minimal branching. After finishing the required portion of the program, the microprocessor sets up the system for the next cycle by generating the necessary data for the next cycle. Finally, the processor locks itself into wait condition, at which time the microprocessor 12 is inactive. The wait state can only be ended by the occurrence of another reset signal. Upon receipt of a reset signal, which corresponds to the high level of the activating signal 60 at the RESET terminal 14, the microprocessor executes the linear program completely and again enters an inactive state. This process repeats as long as no fault conditions are detected by the processor. Detection of the various types of fault conditions drives the microprocessor into an inactive state for safety reasons, regardless of the value of the signal at the RESET terminal 14.

As can be seen in FIG. 1, the microprocessor 12 is also connected to a variety of possible output power devices 46. For the embodiment being described, these power devices are typically SCRs, such as a main valve driver, a pilot valve driver, or a spark transformer. Each of these power devices 46 typically drives a relay used to perform a conventional gas burner system function, such as opening a pilot light valve, igniting the pilot light or opening the main gas valve. The system has been designed such that each of these relays can be operated only on the positive half cycle 52 of the input supply voltage 50, since the relays need a positive voltage to be energized and operated. The significance of this requirement will become evident below.

During the normal operation of the system, the input supply signal 50 is inverted and limited by the voltage inverter 20 to create an square wave activating signal 60, with high and low levels, in the following manner. During the first negative half cycle of the input supply signal 50, the negative voltage charges capacitor 38 to a value of about −18 volts. Resistor 40 limits the current flowing through the capacitor 38 and diode 42. Diode 42, connected with its cathode connected to the supply voltage and its anode to resistor 40 allows current to flow only during the negative half cycle, at which time capacitor 38 is charged to a negative value. During both half cycles of the input voltage, the voltage at the base of transistor 30 is limited by the voltage divider created by resistors 34 and 36. In the preferred embodiment, these values are 100 kOhms and 22 kOhms, respectively. The emitter of transistor 30 is connected to ground, which holds the voltage at the emitter to zero volts. During the positive half cycle, the transistor is off, since the voltage at the base is more positive than the voltage at the emitter. At this time, the negative voltage on capacitor 38 acts as a negative supply voltage to charge capacitor 26. The positive current to charge capacitor 26 flows through diode 24. Capacitor 26 has the potential to be charged up to the value of the negative supply, which would be the negative 18 volts from capacitor 38. The voltage is limited by Zener diode 28, which is used to clamp the voltage on capacitor 26 to around −5.6 Volts in the preferred embodiment. Therefore, during the positive half cycle, the voltage at point 23 is the voltage drop across diode 24, which is about −0.6 volts. This corresponds to the low level 64 of the activating signal 60.

During next negative half cycle of the input supply signal 50, the voltage at the base of transistor 30 is again limited by the same voltage divider. The voltage at the base is now negative in value, and therefore more negative than the zero volts at the emitter and less negative than the voltage at the collector. This causes the transistor to be on during the negative half cycle. While the transistor 30 is on, the point of connection between resistor 32 and capacitor 26 is effectively grounded. As a result of previously mentioned circuit characteristics during the previous positive half cycle, the charge on capacitor 26 was limited to 5.6 volts by Zener diode 28. Because of the direction which diode 24 is connected, capacitor 26 cannot discharge through diode 24.

Therefore, the voltage at point 23 during the negative half cycle of the input voltage is the difference between the charge on capacitor 26, which is around 5.6 volts, and the voltage of diode 24, which is around 0.6 volts. This positive 5 volts at point 23 during the negative half cycle of the input supply signal 50 corresponds to the high level of the activating signal 60. During the negative half cycle, capacitor 38 is again charged to around −18 volts, just as it was during the first negative half cycle.

The activating signal 60 is then applied to the RESET terminal 14 of the microprocessor 12. When the activating signal is high 62, the microprocessor is in an active state and control signals can be sent to the output power devices 46. During the period of time the processor is active and can send operating signals however, the input supply signal is in the negative half cycle. Because SCRs can only be operated during the positive half cycles, they cannot initially be operated when the microprocessor is in an active state. Operating the microprocessor on the negative half cycle and the output circuits on the positive half cycle allows for additional control of the system if there is a failure in the chip that would enable the processor outputs when they should not be enabled. This added safety feature of the invention allows the system to maintain fail-safe control over the burner system.

In actual operation, microprocessor 12 is initially in the active state only during the negative half cycle 54 of the input supply signal 50, at which time the output power devices cannot be operated as previously explained. During this operating time, the microprocessor 12 will perform a series of tests on different variables of the system. These tests are performed during the initial period of the active state of the microprocessor. Some of these tests include checking the information that was stored in RAM during the previous period of operation. Afterward, the microprocessor will execute an algorithm and perform even more tests on the system, including itself. These tests include tests on the RAM, ROM, timing, the operating algorithm and the data. If the system passes all of these tests, the microprocessor will finally be capable of activating the output devices. Conversely, if all the tests are not passed, the program will self terminate during the negative half cycle without ever having the opportunity to operate the outputs.

Until the tests are passed, the system cannot send signals to operate the output devices. All of these tests are meant to insure that the outputs are safe to operate. Before this added feature of operating the microprocessor and outputs on different half cycles, if an error occurred in the microprocessor itself and a signal was sent to the output devices before all the tests were complete, the error could activate an output device at the wrong time or in the wrong sequence. Now, with the added safety feature of the invention, if a signal is sent before all the tests are complete, nothing will happen since the outputs cannot be operated on the negative half cycle when the processor is in the active state.

If the system successfully passes this series of tests, the microprocessor will output a high signal at output terminal 16. This output signal 65, as seen in FIG. 2, is sent through isolation diode 18 to the RESET terminal 14. At the RESET terminal, the signal from the output terminal combines with the activating signal 60 at point 21 of FIG. 1 to form the override signal 70. As can be seen by examination of FIG. 2, the high level of the output signal occurs during the trailing edge of the high level of the activating signal 60. The combined result of these two signals is an override signal 70 with an extended high level 72. This extended high level 72 occurs during the beginning of the positive half cycle 52 of the input supply signal 50. Since the signal applied to the RESET terminal 14 is now high for an extended time, the microprocessor's active state is also extended into the positive half cycle of the input supply signal 50. By extending the active state of the microprocessor 12 to the positive half cycle of the input supply signal, the microprocessor is now able to activate the output power devices 46.

After the output power devices are properly activated during the extended portion 72 of the microprocessor's runtime, the output terminal 16 is returned to a low level. This also causes the override signal 70 to return to a low level since the activating signal 60 is also low due to the inversion of the positive half cycle of the input supply signal 50. Since the value at the RESET terminal 14 is again at a low level, the microprocessor will return to the inactive state and wait for the next high level of the activating signal before entering the active state again. In this manner, the runtime of the microprocessor is extended into the positive half cycle of the input supply signal and microprocessor is able to operate the output devices.

A possible problem in the gas burner control system 10 remains; if output terminal 16 of microprocessor 12 were somehow to become stuck at the high level, the microprocessor could remain in an active state for an indefinite period of time, as the override signal 70 applied to RESET terminal 14 would always be at a high level. This result is precluded, however by the operating software included in the microprocessor. This software has a self terminating nature and would shut the system down within a cycle. After completing the entire series of steps during the operation in one half cycle, the microprocessor enters an inactive state. To reenter the active state, the microprocessor waits for the receipt of another reset signal. To initiate the active state, the reset signal must drop from the high value to the low value and the processor is then activated upon a return to the high value.

Apart from these important safety advantages over the prior art, the inventive gas burner control system 10 also has the added advantage of extending the runtime of the microprocessor 12. The microprocessor-based ignition system is designed such that the program runs from reset to a stop condition during one half of a cycle of the 60 Hz line voltage. This means that 60 times each second, the microprocessor is reset and executes the entire operating program. Therefore, the processing time has to be limited to less than 8.3 mSec. per cycle. With the extended runtime capability of this invention, the active state of the microprocessor does not need to be limited to one half of a cycle. The runtime can be expanded to about 75% of a cycle, which allows for more processing to occur during each active state of the processor. This extension increases the capability of the microprocessor, since it spends less time in the inactive state waiting for a positive input at the RESET terminal 14 to become active again. The extended runtime also increases the amount of processing that can be done during each cycle, which opens the way for more types of checks to be preformed by the current processors.

Operating the system on the negative half cycle and extending the run time into the positive half cycle has another distinct advantage over the prior art in controlling the output power devices 46, which typically are SCRs. Previous systems operate on the positive half cycle, and the processor runs its tests on the initial portion of that half-cycle. After passing all the tests, the processor makes the decision to activate the SCRs. SCRs are pulse devices, which stay on for the remainder of the half-cycle after being triggered. In a typical output circuit, the power device is controlled by a DC relay with a capacitor connected across it to allow the relay to run on the system's AC voltage. The problem with this type of circuit is that there is often not enough time after all the tests are run by the processor to energize the relay. Therefore, if the relay is going to be activated, the amount of processing time available to complete all the test is severely limited to much less than one half cycle.

By operating the microprocessor on the negative half cycle, this limitation on the processing time is eliminated. The processor can now preform all of its test during the negative half cycle and then fire the SCR during the extended portion of the run time in the positive half cycle. This allows for more time for the capacitor to charge and turn on the relay to perform the output function.

It should be noted that microprocessor 12 may be programmed in any convenient programming language to perform the functions outlined herein. Such programming is well within the skill of those in the art, following the functional description set out above.

It is obvious from the present description that this invention could be modified to operate output devices that operate on the negative half cycle, rather than the positive half cycle as disclosed. In this situation, the input supply voltage would only need to be limited in magnitude and not inverted before being applied to the microprocessor at point 23. The microprocessor would therefore be operated on the positive half cycle of the supply, unless the processing time was extended into the negative half cycle. The output devices and the microprocessor would still be operated on different half cycles of the input signal, which is one of the primary benefits of this invention.

While this invention has been described with reference to particular embodiments and examples, other modifications and variations will occur to those skilled in the art in view of the above teachings. Accordingly, it should be understood that within the scope of the appended claims, the invention may be practiced otherwise than as specifically described.

I claim:

1. An apparatus for increasing control over the outputs of a gas burner ignition control system having a periodic input power supply signal to prevent incorrect ignition signals, comprising:

processing means for processing information and executing an operating program,
      said processing means having a reset terminal for receiving an activating signal and an output terminal,
      wherein said output terminal is connected to said reset terminal;
      said output terminal supplying an output signal which combines with said activating signal to form an override signal at said reset terminal,
      said override signal having first and second levels; and inverting means for supplying said activating signal,
      said inverting means receiving the periodic input supply signal and inverting the supply signal to generate said activating signal;
      said inverting means connected to said reset terminal to supply said activating signal to said reset terminal,
      said activating signal having succeeding and repetitive first and second signal levels 180° out of phase from the input supply signal,
      said activating signal being a square wave limited in magnitude to a logic high and a logic low;

wherein said processing means is responsive to said activating signal to enter an active state when said activating signal is at the first level, and said processing means enters an inactive state when said activating signal is at the second level; and said processing means remains in the active state to extend the processing time when said override signal is at the first level and said activating signal is at the second level; and said processing means remains in the active state to extend the processing time only after said processing means has successfully completed a series of tests; and said processing means connected to the output circuits, the output circuits being operational only during the time said processing means remains active due to said override signal being at the first level and said activating signal being at the second level.

2. The apparatus of claim 1, wherein said processing means is a microprocessor for controlling the operation of a combustible gas furnace.

3. The apparatus of claim 1, wherein said operating program comprises a linear program, such that said processing means is configured to execute the entire program once during each active state of the processor.

4. The apparatus of claim 1, wherein the extended processing time allows said processing means to remain active for a period longer than one half cycle of said periodic input supply signal.

5. The apparatus of claim 1, wherein said processing means enters an inactive state if said processing means does not successfully complete a series of tests, said tests including tests on the processing means itself, tests on the memory, and tests on the data stored from the pervious cycle of said linear program.

6. An apparatus for increasing control over the outputs of a gas burner ignition control system having a periodic input power supply signal to prevent incorrect ignition signals, comprising:

processing means for processing system information and operating system outputs; and a reset terminal on said processing means, said reset terminal disposed to receive an externally applied periodic activating signal having regularly spaced, alternating high and low levels,
      said periodic signal being 180° out of phase from the input supply signal;
      said processing means being configured to initially enter an active state only during the high level of said periodic activating signal; and output circuits connected to said processing means, said output circuits being capable of operation only during the positive portion of the input supply signal;

said processing means configured to conduct tests while the processing means is in said active state,
      said processing means being capable of extending said active state only after passing said series of tests; and
      said processing means being able to activate said output circuit only during said extended active state.

7. The apparatus of claim 6, wherein said processing means executes an operating program which includes a predetermined sequence of steps to be executed in a linear manner.

8. The apparatus of claim 6, wherein said processing means remains in an inactive state if said series of tests are not passed.

9. The apparatus of claim 6, wherein said output circuits can be controlled by said processing means during the positive half cycle of said input supply signal, said processing means being able to trigger said output devices during the early portion of the half cycle to allow said output devices to operate for a longer period of time.

* * * * *